:::

US008281001B2

(12) United States Patent
Busam et al.

(10) Patent No.: US 8,281,001 B2
(45) Date of Patent: Oct. 2, 2012

(54) DEVICE-TO-DEVICE NETWORK

(75) Inventors: Vincent R. Busam, Los Angeles, CA (US); Shachar Ron, West Hills, CA (US); Scott R. Siegrist, San Carlos, CA (US); Dannie C. Lau, Santa Clara, CA (US); Daniel Benyamin, Oakland, CA (US)

(73) Assignee: Harman International Industries, Incorporated, Northridge, CA (US)

( * ) Notice: Subject to any disclaimer, the term of this patent is extended or adjusted under 35 U.S.C. 154(b) by 3552 days.

(21) Appl. No.: 09/955,665

(22) Filed: Sep. 19, 2001

(65) Prior Publication Data
US 2002/0087887 A1 Jul. 4, 2002

Related U.S. Application Data

(60) Provisional application No. 60/233,741, filed on Sep. 19, 2000.

(51) Int. Cl.
*G06F 15/173* (2006.01)
(52) U.S. Cl. ........ 709/224; 709/217; 709/227; 709/250; 726/4; 726/5; 726/6; 726/7
(58) Field of Classification Search .................. 709/224, 709/223, 248, 243, 250, 217, 227
See application file for complete search history.

(56) References Cited

U.S. PATENT DOCUMENTS

| | | | |
|---|---|---|---|
| 5,557,541 A | 9/1996 | Schulof et al. | |
| 5,987,454 A * | 11/1999 | Hobbs | 1/1 |
| 6,026,439 A | 2/2000 | Chowdhury et al. | |
| 6,061,734 A * | 5/2000 | London | 709/238 |
| 6,061,738 A | 5/2000 | Osaku et al. | |
| 6,065,120 A | 5/2000 | Laursen et al. | |
| 6,094,676 A * | 7/2000 | Gray et al. | 709/217 |
| 6,119,163 A | 9/2000 | Monteiro et al. | |
| 6,192,340 B1 | 2/2001 | Abecassis | |
| 6,233,682 B1 | 5/2001 | Fritsch | |
| 6,292,657 B1 | 9/2001 | Laursen et al. | |
| 6,360,266 B1 * | 3/2002 | Pettus | 709/227 |
| 6,366,907 B1 * | 4/2002 | Fanning et al. | 707/3 |
| 6,463,471 B1 * | 10/2002 | Dreke et al. | 709/224 |
| 6,470,453 B1 * | 10/2002 | Vilhuber | 726/4 |
| 6,523,022 B1 * | 2/2003 | Hobbs | 1/1 |
| 6,571,245 B2 * | 5/2003 | Huang et al. | 707/10 |
| 6,662,231 B1 * | 12/2003 | Drosset et al. | 709/229 |
| 6,751,669 B1 * | 6/2004 | Ahuja et al. | 709/228 |
| 6,871,226 B1 * | 3/2005 | Ensley et al. | 709/224 |
| 6,928,469 B1 * | 8/2005 | Duursma et al. | 709/223 |
| 7,099,950 B2 * | 8/2006 | Jones et al. | 709/230 |
| 7,159,028 B1 * | 1/2007 | Jones et al. | 709/230 |
| 7,188,358 B1 * | 3/2007 | Hisada et al. | 726/2 |
| 7,318,103 B1 * | 1/2008 | Jones et al. | 709/230 |
| 7,346,605 B1 * | 3/2008 | Hepworth et al. | 1/1 |
| 2002/0023158 A1 * | 2/2002 | Polizzi et al. | 709/227 |
| 2002/0052885 A1 * | 5/2002 | Levy | 707/200 |

\* cited by examiner

*Primary Examiner* — Backhean Tiv
(74) *Attorney, Agent, or Firm* — Brinks Hofer Gilson Lione

(57) ABSTRACT

A device to device network allows an entity to seamlessly access content stored on various devices. Many devices can be registered on a network; however, an entity will only have access to devices for which the entity is authorized to access. In one embodiment, the entity can only access devices that have been authenticated with the same username. While using the device-to device network, an entity can transfer files, stream files, create and use play lists, send commands to various devices and explore the contents of various devices.

22 Claims, 10 Drawing Sheets

DEVICE-TO-DEVICE NETWORK

This application claims the benefit of U.S. Provisional Application No. 60/233,741, "Personal Device-to-Device Networking," filed on Sep. 19, 2000, incorporated herein by reference.

BACKGROUND OF THE INVENTION

1. Field of the Invention

The present invention is directed to networking technology and the communication of data.

2. Description of the Related Art

With the emergence of broadband technologies and the maturity of digital content, consumer adoption of digital music, images, video and other content has been growing. New technologies have been created to address how to distribute, store and access digital content. However, these new technologies have not kept pace with the needs of consumers.

Early attempts to provide services to those interested in digital music relied on a model that included a central point to store and serve audio files. However, consumers have shown resistance to storing all of their data on a central server. Alternatively, many consumers have utilized peer-to-peer systems, such as Napster, which store content in a distributed fashion among various user computers. One shortcoming of the existing peer-to-peer systems is the lack of security. A consumer who exposes its content to the network, must do so for all to access. The issues faced by the digital music industry are also relevant to other digital content.

Additionally, the use of content is restrained by the inability to access the content from more than one device. Each device receives its content from a different source, such as a Cable TV system or the Internet. Because these devices are unable to communicate with each other, the consumer is not able to listen or view media when not in direct contact with the device receiving or storing the content. For example, a PDA is currently incapable of accessing TV programming from a cable TV subscription. As a result, content providers miss out on an opportunity to provide media to a consumer who desires it and is willing to pay for it.

SUMMARY OF THE INVENTION

The present invention, roughly described, pertains to a device-to-device network that allows an entity to seamlessly access content stored on various devices. Many devices can be registered on the network; however, an entity will only have access to devices for which the entity is authorized to access. In one embodiment, the entity can only access devices that have been authenticated with the same username. While using the device-to device network, an entity can transfer files, stream files, create and use playlists, send commands to various devices and explore the contents of various devices.

One embodiment of the present invention includes a method for communicating data. The method includes the step of receiving a request to access a network of devices, where the network of devices includes a set of devices the user is authorized to access and a set of devices that the user is not authorized to access. The devices that the user is authorized to access are distributed across the Internet (or another global network). The process includes identifying the devices that the user is authorized to access and allowing communication with those devices and not allowing communication with the devices that the user is not authorized to access.

Another embodiment of the present invention includes logging a first user into a network of devices using a first user identification. The network of devices includes devices logged into the network using the first user identification and devices logged into the network using one or more other user identifications. The system identifies the devices that are logged into the network using the first user identification and allowing communication with those devices, while not allowing communication with devices that are logged into the network using other identifications.

The present invention can be accomplished using hardware, software, or a combination of both hardware and software. The software used for the present invention is stored on one or more processor readable storage devices including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

DETAILED DESCRIPTION

Figure 1:
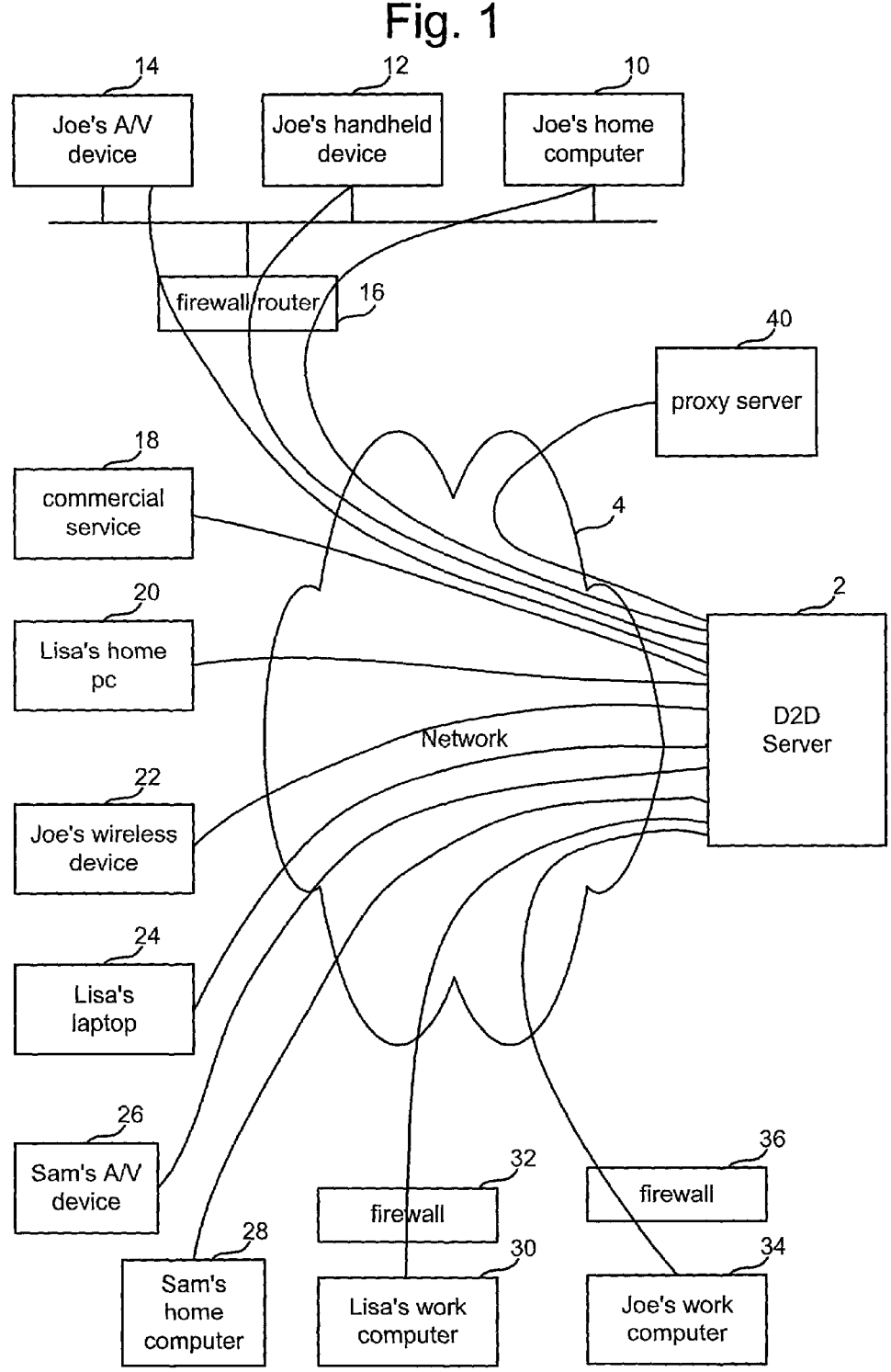
FIG. 1 is a block diagram of a device-to-device network.

FIG. 1 is a block diagram of an exemplar device-to-device network. FIG. 1 depicts server 2 in communication with various other devices via network 4. Network 4 can be the Internet (or another global network), a local area network, a wide area network, a wireless network, any other type of network, or any combination of networks. The various entities communicating with server 2 are referred to as devices. These devices can be a physical apparatus or a software process (or thread, etc.) running on a physical apparatus. For example, a device can be a computer, a browser running on a computer, a digital music player running on a computer, a stand-alone music player, a video player, etc. Additionally, a particular physical device can have multiple software devices communicating on a device-to-device network. The devices depicted in FIG. 1 include home computer 10, handheld device 12, and A/V device 14, all connected via a LAN and communicating on network 4 via firewall (and/or router) 16. Home computer 10 is owned by Joe and, thus, is labeled Joe's home computer. Handheld device 12 is owned by Joe and is labeled as Joe's handheld device. A/V device 14 is owned by Joe and is labeled as Joe's A/V device 14. An A/V device is any device that can play audio and/or video content. An example can be a computer, video player/recorder, audio player/recorder, audio content server, video content server, television, stereo, etc., or any combination of the above.

Commercial service 18 is also depicted as being in communication with server 2 via network 4. Commercial service 18 is a service that is publicly available to a network. One example can be a portal, news source, database, etc. available as a web site (or otherwise) on the Internet. In one embodiment, commercial device 18 and server 2 can be accessed by any user or a defined group of users. One implementation allows commercial service 18 to charge for searching or retrieving content.

FIG. 1 also shows Lisa's home PC 20, Joe's wireless device 22, Lisa's laptop 24, Sam's A/V device 26 and Sam's home computer 28, all connected to server 2 via network 4. Joe's wireless device can be a wireless handheld computing device, a cellular telephone, or any other wireless device capable of communicating with server 2. Finally, FIG. 1 shows Lisa's work computer 30 connected to server 2 via firewall 32 and Joe's work computer 34 connected to server 2 via firewall 36. FIG. 1 shows a set of exemplar devices that can communicate with server 2. Other examples of devices include a set top box, portable music player, car stereo, or any other device where content can be consumed, stored and/or recorded. In most cases, the devices will include a processor, memory, a non-volatile storage device, input/output devices and a communication interface (e.g., modem, network interface, etc.) that are in communication with each other. However, almost any kind of device that can communicate on a network and can store or access data can be part of a device-to-device network.

One feature of the device-to-device network is that any particular device can only see other devices on the network for which that device is authorized to communicate with. In one embodiment, a device can only access other devices on the network that have been authenticated with the same username. In another embodiment, groups can be set up. When a device logs into the device-to-device network, it can only see other devices that have been logged in by users in the same group. In another embodiment, custom rules can be set up for access. Examples of a rule can be that "set-top boxes can only talk to other set-top boxes."

Figure 2:
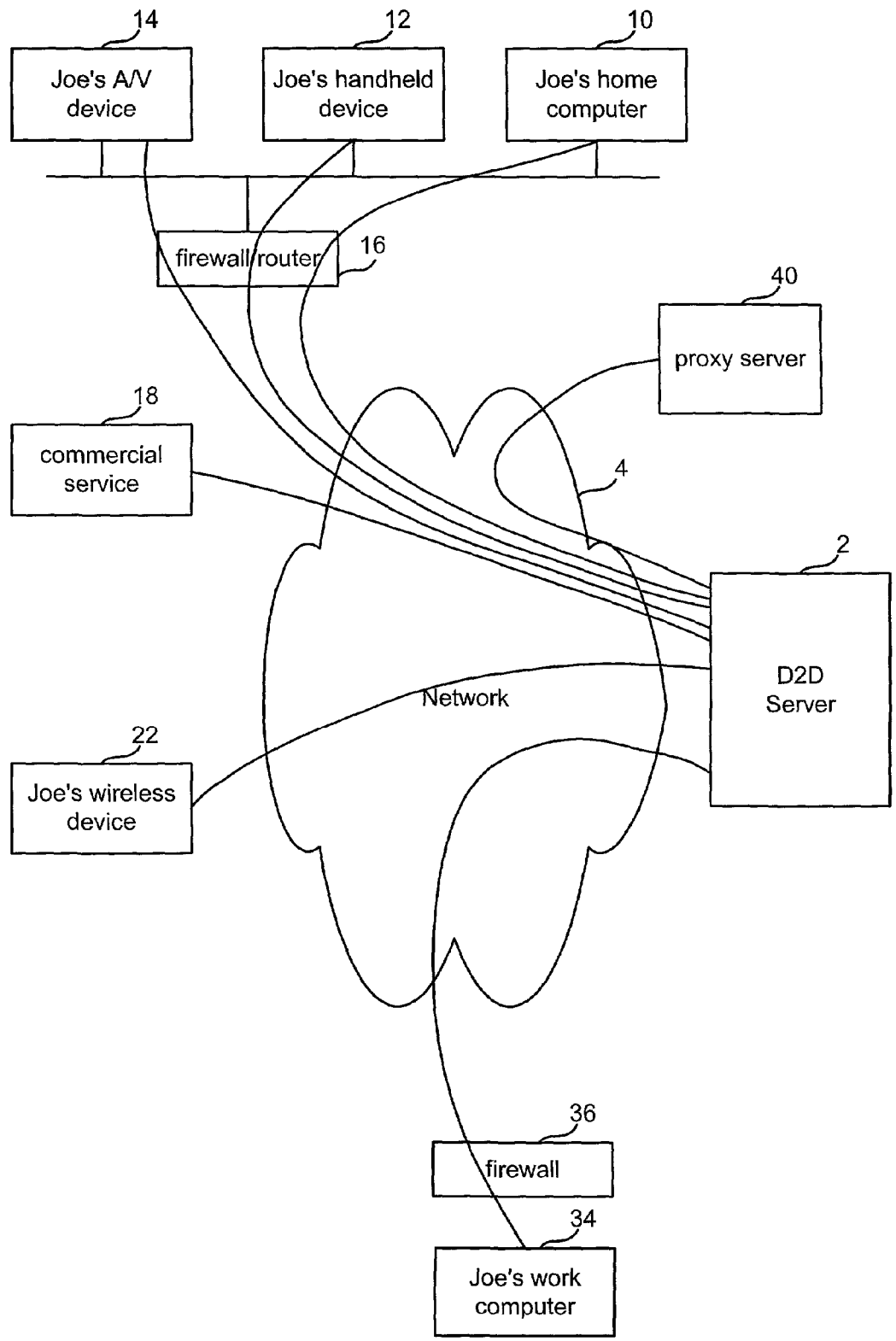
FIG. 2 is a block diagram of a portion of the device-to-device network.

FIG. 2 shows an example of how a device logged into a device-to-device network can only see other devices authenticated to the same user. FIG. 2 assumes that Joe's home computer 10, Joe's handheld device 12, Joe's A/V device 14 and Joe's wireless device 22 have all been logged in and authenticated using Joe's username and password. Thus, these devices can only see the devices depicted in FIG. 2. That is, Joe's wireless device, when logged into the device-to-device network will be able to see Joe's home computer 10, Joe's handheld device 12, Joe's A/V device 14, commercial service 18, proxy server 40 (optional), server 2 and Joe's work computer 34. Joe's wireless device 22 will not be able to see Lisa's home PC 20, Lisa's laptop 24, Sam's A/V device 26, Sam's home computer 28 and Lisa's work computer 30.

Figure 3:
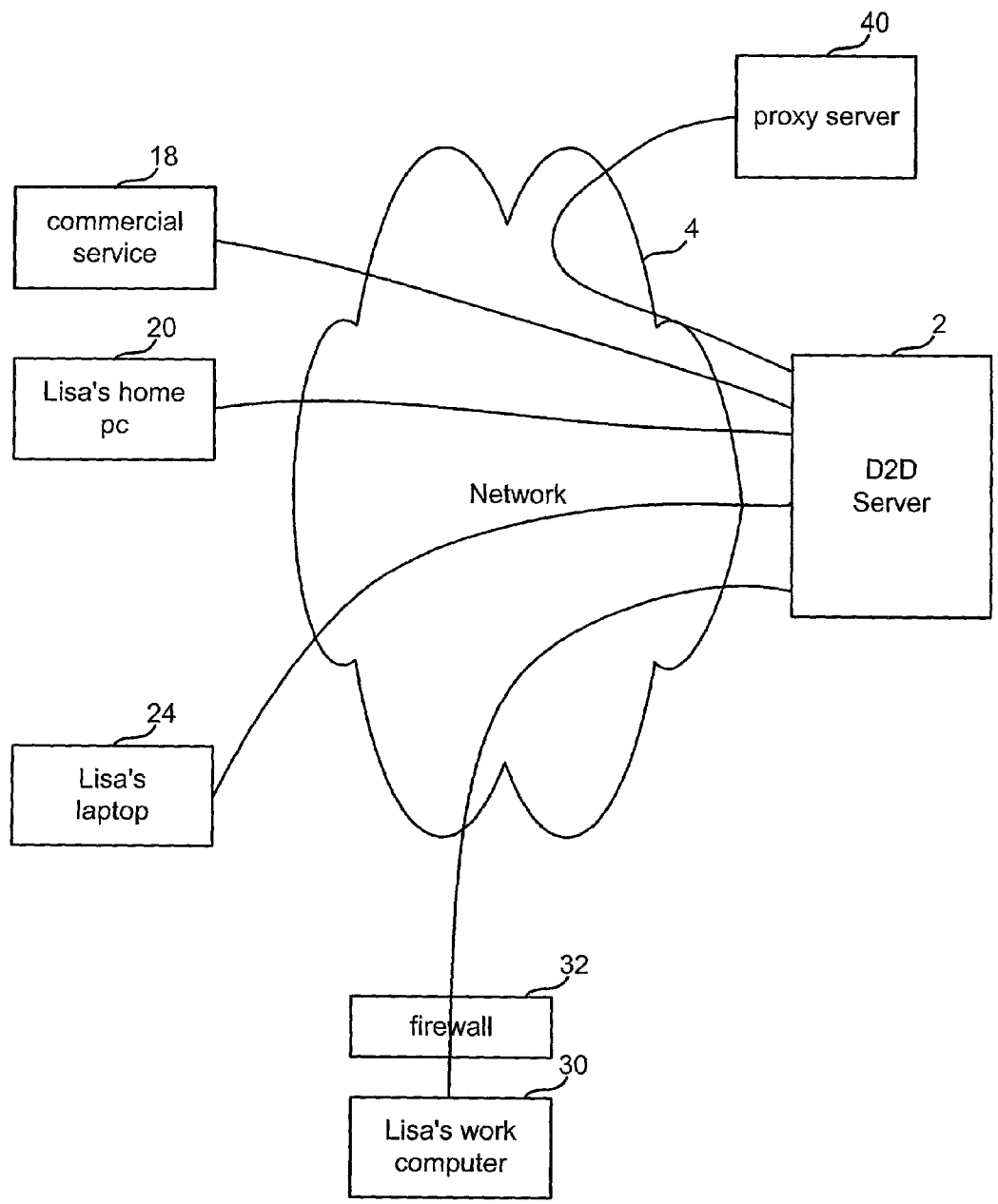
FIG. 3 is a block diagram of a portion of the device-to-device network.

Similarly, when one of Lisa's devices log in, they will see the devices depicted in FIG. 3. That is, a device owned by Lisa can see Lisa's home PC 20, Lisa's laptop 24, Lisa's work computer 30, commercial service 18, proxy server 40 (optional) and server 2. Lisa's devices will not be able to see Sam's devices or Joe's devices.

Figure 4:
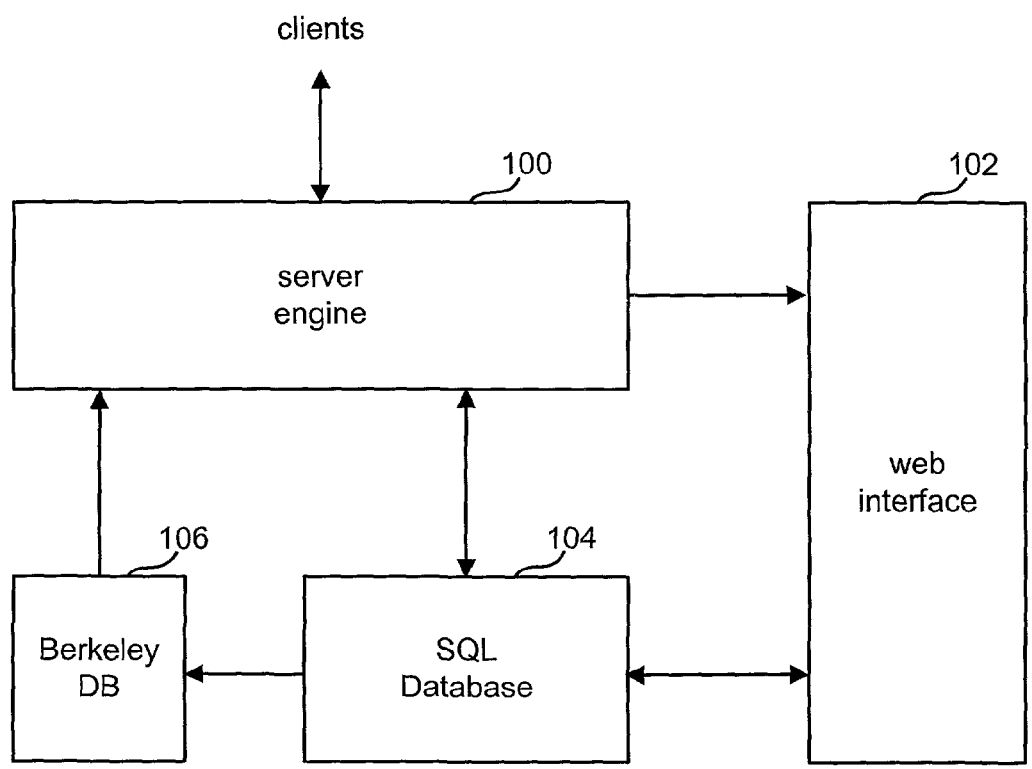
FIG. 4 is a block diagram of a server used in the device-to-device network.

FIG. 4 is a block diagram of one embodiment of server 2. The main component of the server is server engine 100, which handles all communication with the client devices. User data is stored in SQL database 104, which can optionally be cached in Berkeley DB style hash database 106 for faster access. Web interface 102 manages the user information in the database and can query server status. Server engine 100 communicates with clients and the web interface 102 through TCP/IP and a proprietary protocol (discussed below). Server engine 100 and web interface 102 communicate with SQL database 104. A shell script exports data from the SQL database 104 to Berkeley DB 106. Server engine 100 communicates directly with Berkeley DB 106.

Each of the client devices is provided with a library/API for connecting and performing services on the device-to-device network. Applications can be created which access the API in order to implement the necessary functions specific to the devices. As discussed above, each device on the device-to-device network can implement one or more of the device-to-device API functions: searching, downloading, sharing, streaming from other devices, streaming to other devices, creating/managing playlists across multiple devices, issue commands, receive commands and proxy services. These functions will be discussed in more detail below.

Figure 5:
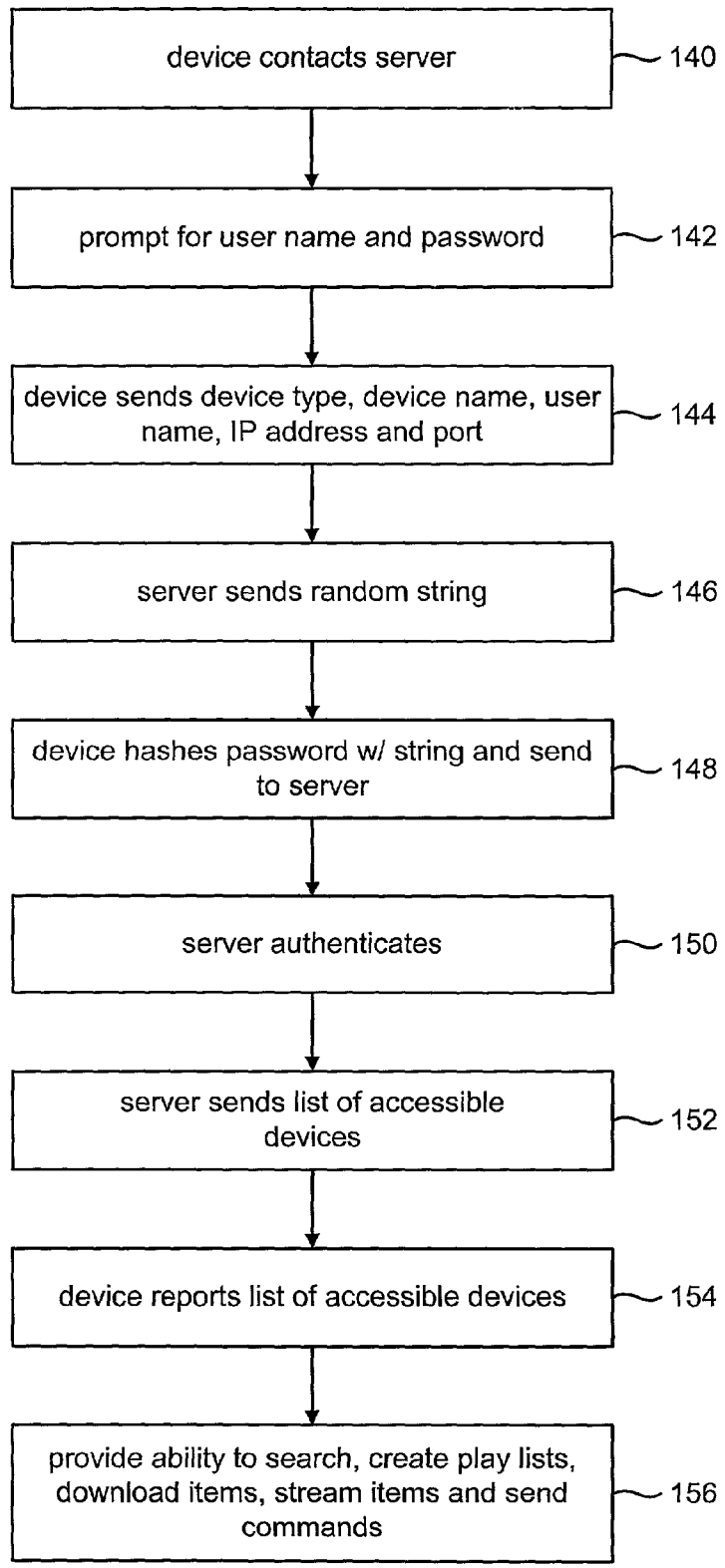
FIG. 5 is a flow chart describing one embodiment of a process used for a de vice to join the device-to-device network.

FIG. 5 is a flowchart describing one embodiment of a process for a device to join the device-to-device network. In step 140, the device seeking to join the network contacts server 2 indicating that it wishes to join the network. In step 142, the device prompts the user for a username and password. In some embodiments, the username and password can be permanently stored in the device so that a prompt is unnecessary. In step 144, the device sends a message to server 2, which indicates the device type, device name, username, IP address and port. The device type indicates what type of device such as a computer, wireless device, browser client, etc. The device name is a name of the particular instance of the device. For example, each browser window on a computer is a separate device and has its own device name. Some applications may ask the user to choose a device name. Other applications may arbitrarily choose a random device name. Each device connecting to a device-to-device network is an instance. In step 146, server 2 sends a challenge to the device. The challenge is a random string. In step 148, the device hashes the password with the string and sends the hashed password to server 2. In step 150, server 2 authenticates the user. In one embodiment, server 2 includes a database that stores a username and password for each user authorized to use the device-to-device network. Group information may also be stored on servers. Step 150 includes the server 2 accessing the database to compare the supplied username and password to the database.

In step 152, the server sends a list of accessible devices to the requesting device. That is, after a user is authenticated, server 2 will determine which devices the user may access. In one embodiment, the user may access all devices that are logged into the device-to-device network using the same username. Additionally, the user can access any device for which the user is a member of a group that is allowed to access the device. Step 152 includes determining this list of accessible devices and sending that list to the requesting device. In step 154, the device reports the list of accessible devices to the user. In step 156, the ability to search, create playlists, download items, stream items, explore and send commands is provided to the user. In one embodiment, steps 154 and 156 are implemented by using a graphical user interface (GUI). After the search, the GUI displays a list of the device names for each accessible device and buttons to create a new playlist, edit an existing playlist, or perform a search. If the user were to select any of the devices listed, in one embodiment, the network would determine and report all the items that are accessible on that device. A search would also return a list of items. Once the user is provided with a list of items, the user can select one or more of the items for downloading or for streaming. Note that current technology typically stores data such as music, video, etc., as files. As technology advances, other paradigms can be used and, thus, the term "items" is used to generically refer to any unit of data that can be accessed. One example of an item is a file.

Figure 6:
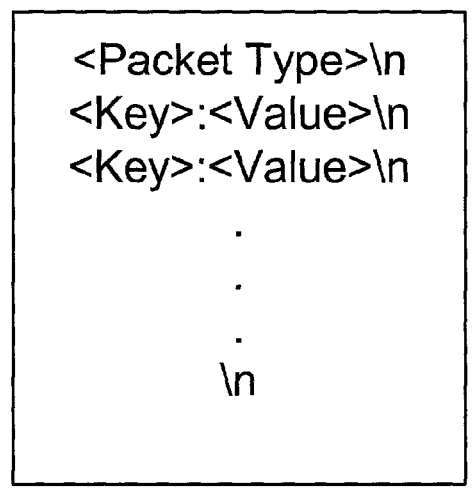
FIG. 6 is a block diagram depicting the format of an exemplar protocol for communicating on the device-to-device network.

Devices on the device-to-device network will use TCP/IP to communicate. A proprietary protocol is used at the application layer. This allows communication over an Internet connection. Each device connecting to the device-to-device network will create a connection to server 2. FIG. 6 depicts the format of the proprietary protocol at the application layer. The first line of a packet includes a Packet Type followed by "n". After the packet type, a number of Key:Values are provided. After the last Key:Value, the "n" is used to indicate the end of a packet. An exemplar set of Packet Types and the relevant Keys are described by Table 1 and Table 2, below.

TABLE 1

| Packet Type | Key |
| --- | --- |
| LOGIN | username |
|  | device type |
|  | device name |
|  | IP address |
|  | port |
|  | version |
| CHALLENGE | string |
| RESPONSE (to challenge) | string |
| LOGIN RESULT | success |
|  | error |
| INSTANCES | number of instances |
|  | name |
|  | port |
|  | IP address |
|  | device |
|  | username |
|  | device name |
| SEARCH (from client) | keyword |
|  | search type |
|  | device name |
|  | (optional target name) |
| SEARCH (from server) | keyword |
|  | search type |
|  | device name (source) |
| SEARCH RESULTS | device name |
|  | IP address |
|  | port |
|  | search type |
|  | keyword |
|  | number |
|  | result type |
|  | page |
|  | if result type = file, add the following: |
|  | size |
|  | duration |
|  | bitrate |
|  | frequency |
|  | title |
|  | artist |
|  | album |
|  | year |

TABLE 1-continued

| Packet Type | Key |
| --- | --- |
|  | genre |
|  | md5 |
|  | if result type = URL, add the following: |
|  | title |
|  | URL |
|  | if result type = dynamic URL, (same as file) |
|  | if result type = playlist, add the following: |
|  | path |
|  | description |
|  | number of files |
| HELLO (server to proxy) |  |
| ACKNOWLEDGE (proxy to server) |  |
| PROXY | to |
|  | type |
| DOWNLOAD | name |
|  | (chat requesting file) |
|  | path |
|  | range (in bytes, |
|  | of portion of filter) |
| DOWNLOAD RESPONSE | error |
|  | md5 |
|  | size |
|  | path |
|  | name (client sending ifle) |
|  | new path (if redirect given) |
| SEND MESSAGE | to |
|  | data |
| MESSAGE | to |
|  | data |
| SEND COMMAND (source-to-server) | to |
|  | command |
| COMMAND (server-to-target) | from |
|  | command |
| COMMAND RESPONSE | status |
|  | error |
| SAVE PREFERENCE | string |
| DELETE PREFERENCE | string |
| GET PREFERENCE |  |
| REPORT PREFERENCE | string |
|  | string |
| . | . |
| . | . |
| . | . |

TABLE 2

| Error Code | Explanation |
| --- | --- |
| 400 | firewalled, use proxy |
| 401 | firewalled, no proxy available |
| 402 | redirect, new path given |
| 404 | file not found |
| 100 | malformed login packet |
| 101 | instance already logged in |
| 102 | bad password |
| 105 | firewalled |

Figure 7:
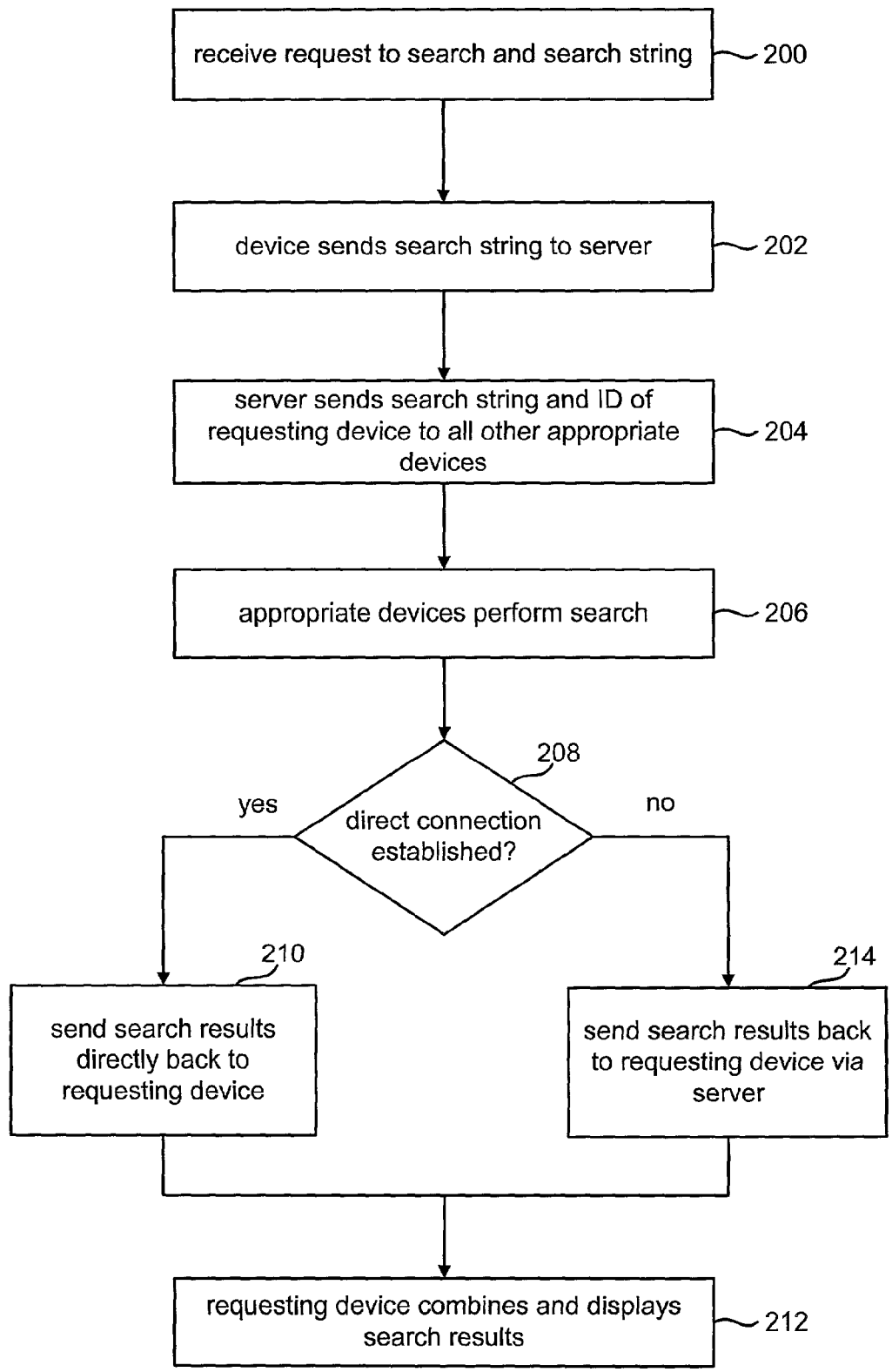
FIG. 7 is a flow chart describing one embodiment of a process for searching on the device- to-device network.

FIG. 7 is a flowchart describing one embodiment of a process for searching on the device-to-device network. As discussed above, in one embodiment a user can request a search by using a button (or other device) on a GUI and by providing a search string. This search string will be searched against all file (or item) names and tag information for each item available to that user on the device-to-device network. In some embodiments, the search can be restricted to just file names, just titles (e.g., movie titles, song titles, etc.), albums, artists, etc., or other information. In step 200 of FIG. 7, the device receives a request to search and the search string. In step 202, the device sends the search string with the search request to server 2. In step 204, server 2 sends the search string and the device name of the requesting device to the appropriate devices. That is, server 2 will access the database to determine which devices are available to the requesting device and send the search string to those devices. For example, looking at FIGS. 1 and 2, if a search is sent from Joe's wireless device 22, to server 2, then server 2 would forward the search to Joe's home computer 10, Joe's handheld device 12, Joe's A/V device 14 and Joe's work computer 34. In step 206, all of the devices that received the search request will perform a search.

After the search is preformed in step 206, each of the devices will attempt to communicate the search results back to the requesting device (e.g., Joe's wireless device 22). It is preferable that the search results return a list of items. In alternative embodiments, the actual items can be sent back too (or instead of). In order to reduce the load on server 2, each of the devices performing a search will attempt to connect directly to the requesting device (bypassing server 2) in order to report the search results. If a direct connection can be established (step 208), then the results are sent directly back to the requesting device in step 210. If a direct connection cannot be established (step 208), then the search results are sent back to the server 2 and server 2 forwards the results to the requesting device. Each reporting device will separately perform step 208 and either step 210 or step 214. After all the search results have been received by the requesting device, the requesting device will combine the results and display the search results in step 212. For example, when Joe's wireless device 22 receives the search results from the other devices 10, 12, 14 and 34, the results will be combined into one list of files which will be reported using the GUI. Each title will serve as a hyperlink so that selecting that title will cause the title to be streamed to Joe's wireless device for playing on Joe's wireless device. Additionally, next to each title will be a check box. The user can select the appropriate check box for each song the user wishes to download. Then, the user can select a download button and those selected songs will be downloaded. Various alternative versions of a GUI can also be used.

Figure 8:
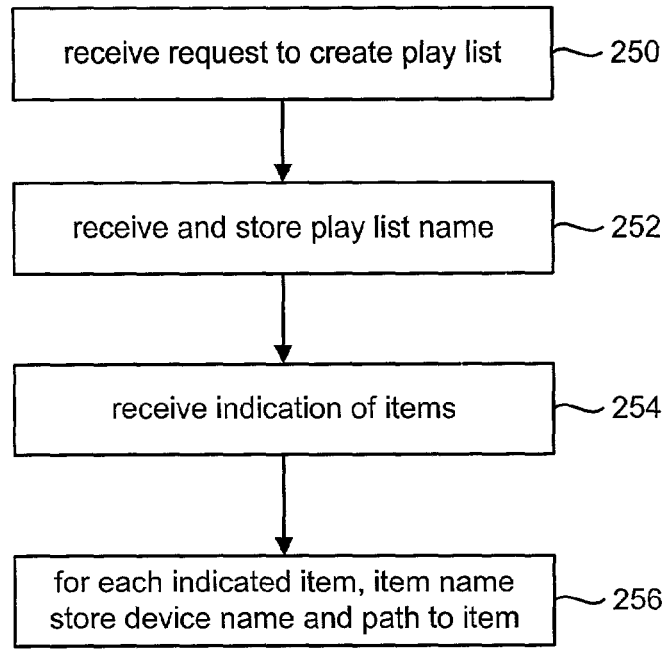
FIG. 8 is a flow chart describing one embodiment of a process for creating a playlist on the device-to-device network.

FIG. 8 is a flowchart describing one embodiment of a process of creating a playlist on the device-to-device network. In step 250, the device receives a request to create a playlist. For example, while search results are being displayed or a list of items from a device are being displayed, the GUI may include buttons for creating and editing playlists. If the user selects to create a playlist, the user will also need to input the name of the new playlist. In step 252, the device receives and stores the name for the new playlist. In step 254, the device receives the indication of which items to add to the playlist. In one example, a set of items can be listed with a check box next to each item. The user selects the check box for each item to be added to the playlist. Then when the user selects to create the playlist, those checked items will be added to the playlist in step 256. For each item added to the playlist, the device stores the name of the item, the name of the device that the item is being stored on, and the path on that device to the item. Because the playlist includes the name of the device and the path name on that device, a playlist can include items on different devices in the network that are accessible to the user, including different types of devices that are on different local area networks.

Figure 9:
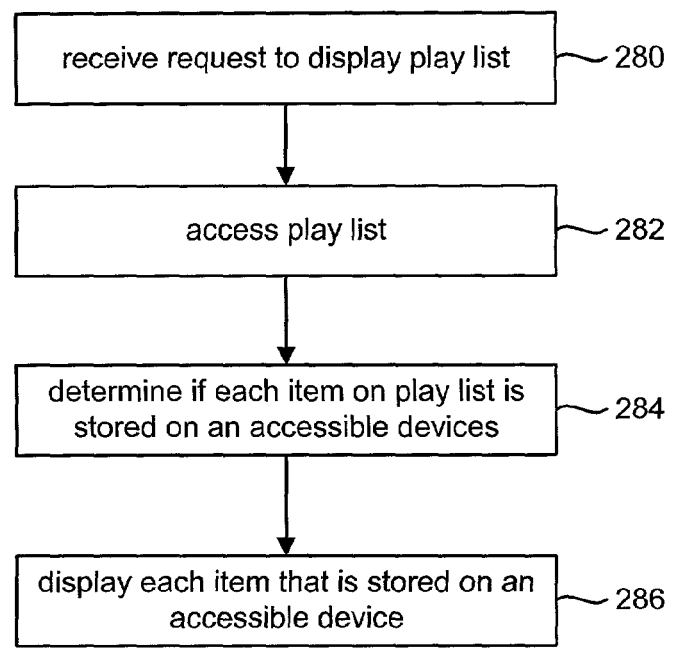
FIG. 9 is a flow chart describing one embodiment of a process for displaying a playlist on the device-to-device network.

In one embodiment, the GUI for a particular device will have a button, or other device, for displaying playlists. FIG. 9 is a flowchart describing the process that a device uses to display a playlist. In step 280, the device receives a request to display the playlist. That request includes an identification of the name of the playlist. In step 282, the stored playlist is accessed. If the playlist is another device that the user is authorized to access, it is retrieved from that device. In step 284, the system determines whether each item on the playlist is stored on an accessible device. Each item on the playlist that is on an accessible device is then reported using the GUI.

Figure 10:
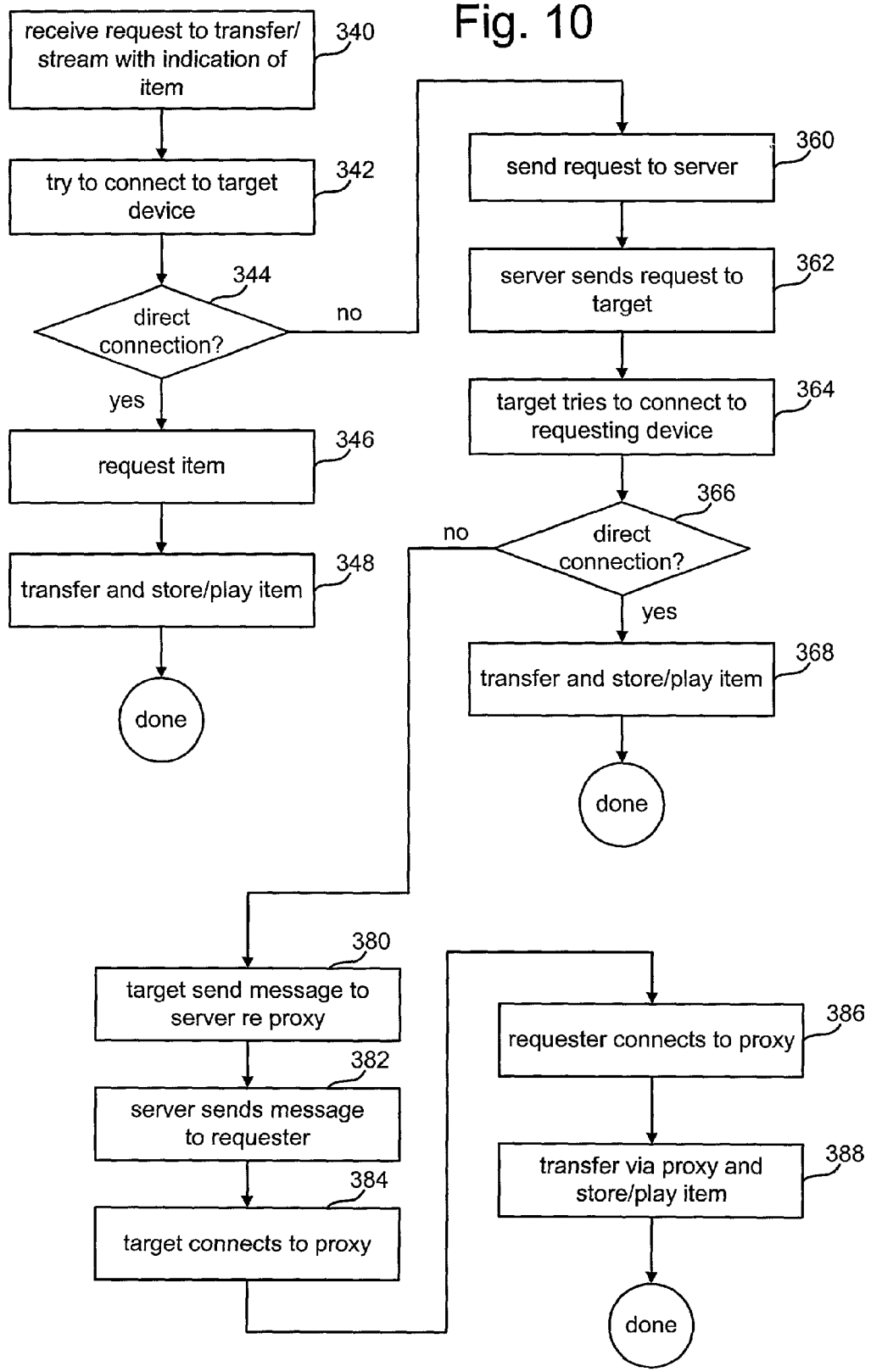
FIG. 10 is a flow chart describing one embodiment of a process for transferring or streaming data on the device-to-device network.

FIG. 10 is a flowchart describing one embodiment of a process for transferring or streaming data on the device-to-device network. In step 340, a request to transfer or stream is received with an indication of the item or items to be transferred or streamed. The device currently being operated by the user is called the requesting device. In step 342, the requesting device will try to connect to the target device. The target device is the device that is storing the item to be transferred or streamed. If the requesting device can connect to the target device (step 344), then the requesting device will request that particular item be transferred from the target device in step 346. In step 348, the requested item will be transferred to the requesting device after the target verifies that the source is properly authenticated. If the request by the user was to transfer the file, then that item will be stored in step 348. If the request was to stream, then the item being transferred will be stored in a temporary buffer file and played from the temporary buffer file.

If, in step 344, it is determined that the requesting device cannot connect to the target device, then the requesting device will forward a request to the server in step 360. The server will then send the request to the target device in step 362. In step 364, the target device will attempt to directly connect (e.g. without going through the server) to the requesting device. If the target device can connect directly to the requesting device (step 366), then the requested item will be transferred in step 368. If the file is to be transferred, then it is stored in step 368. If the file is to be streamed, then it is played from the temporary buffer. If the target was unable to connect to the requesting device (step 366), then the target will send a message in step 380 to the server that it will be using a proxy to communicate the requested information. In step 382, the server will then send a message to the requesting device indicating that the target will be sending its data via a proxy. This message will identify the proxy (e.g., proxy server 40). In step 384 the target device will connect to the proxy. In step 386 the requesting device will connect to the proxy. In step 388, the target device will transfer the requested item(s) to the requesting device via proxy 40. If the request was to transfer data, the data will be stored. If the request was to stream data, the data will be played from a buffer file.

The transfer process attempts to minimize the burden on the server. Thus, if the source of the request can directly connect to the target, then the transfer is performed without using the server. If the source cannot connect to the target, the source will send the request via the server and the target will attempt to connect directly to the source. In the second manner, the request places a minimal burden on the server as compared to the burden that would be on the server if the server had to transfer all the data. If the target cannot connect directly to the requester, then the transfer of data will be done through a proxy server in order to minimize the burden on the server. If the server was used to transfer data, then the server may become overloaded and the network will no longer function with reasonable performance.

The reason for the different types of connections is due to firewalls, addressing and other issues of communicating on a network. For example, Joe's home computer 10, Joe's handheld device 12, and Joe's AV device 14 are all operating on a private LAN. Presumably, the LAN uses private IP addresses which are not globally unique on the Internet and cannot be used on the global Internet. In one implementation, firewall/ router 16 employs Network Address Translation (NAT) to allow devices 10, 12 and 14 to communicate on the Internet. Thus, a device outside of the LAN using conventional technology cannot initiate a communication with any of the devices inside the LAN. However, Joe's home computer 10 can establish a connection with the handheld device 12 or AV device 14 because they are all inside the LAN. Thus, when Joe's home computer 10 is requesting a file on Joe's handheld device 12 a direct connection can be made and the item is transferred directly in step 348. If Joe's wireless device, which has a globally unique IP address, attempts to request information from Joe's home computer it is likely that Joe's wireless device 22 will not be able to establish a connection with Joe's home computer 10; however, Joe's home computer 10 (the target) will be able to establish communication with Joe's wireless device 22. Therefore, the items will be transferred in step 368. On the other hand if Joe's work computer 34 attempts to connect to Joe's home computer, both are on private networks with firewalls; therefore, the proxy server 40 will need to be used.

Figure 11:
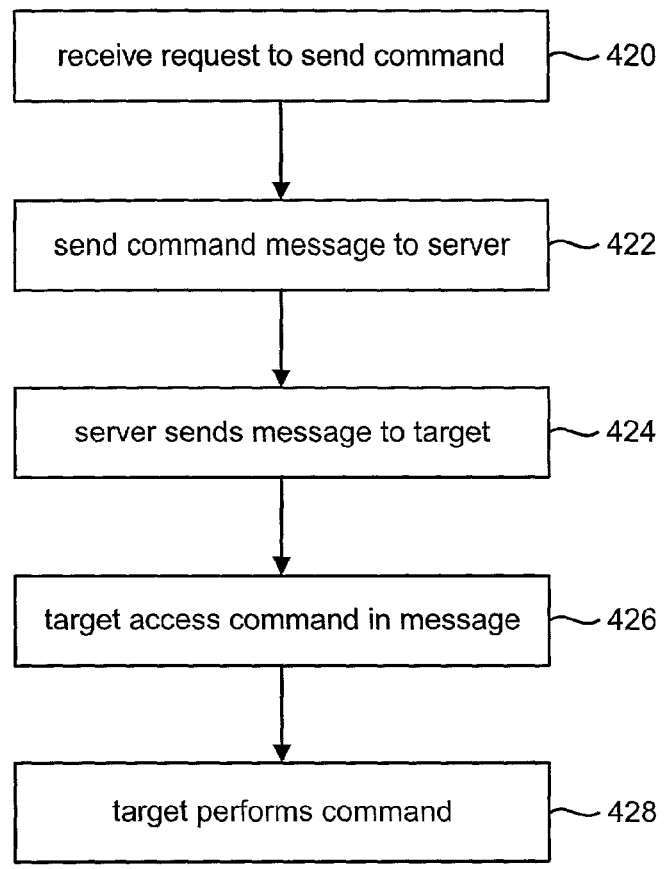
FIG. 11 is a flow chart describing one embodiment of a process for issuing commands on the device-to-device network.

FIG. 11 is a flowchart describing one embodiment of issuing commands on the device-to-device network. It is anticipated that the GUI will include means for inputting commands (e.g., a text box, menu and/or button). The input must include the command and the device to send the command to. The device-to-device network will send the command from the requesting device to the target device. The target device must be programmed to understand the command and know how to act on the command. For example, a system can be set up on a computer that has a writable DVD system and a television signal input to remotely record a television program on a DVD. Alternatively, a stand-alone video recorder can include logic for connecting to a device-to-device network and accepting commands to be remotely controlled. A music player can be remotely controlled to record from the radio. Alternatively, a computer can be controlled remotely by sending commands to the computer. In step 420, the device receives the request to send the command. This request will include the actual command and the device to send the command to. In step 422, the command will be sent to server 2. In step 424, the server sends the command to the target. In step 426, the target accesses the command in the message from the server. In step 428, the target performs the command.

In one embodiment, the device-to-device network supports messaging between devices. A device can send messages to another device in a similar manner that search requests are sent (e.g. passed through the server).

An alternative embodiment of the present invention allows a device-to-device network to be set up between devices on a local area network (or other type of network) without a server. When transferring files, streaming, sending commands, sending search requests, etc., direct connections can be established (steps 342 and 344) and the item/data will be transferred directly.

Figure 12:
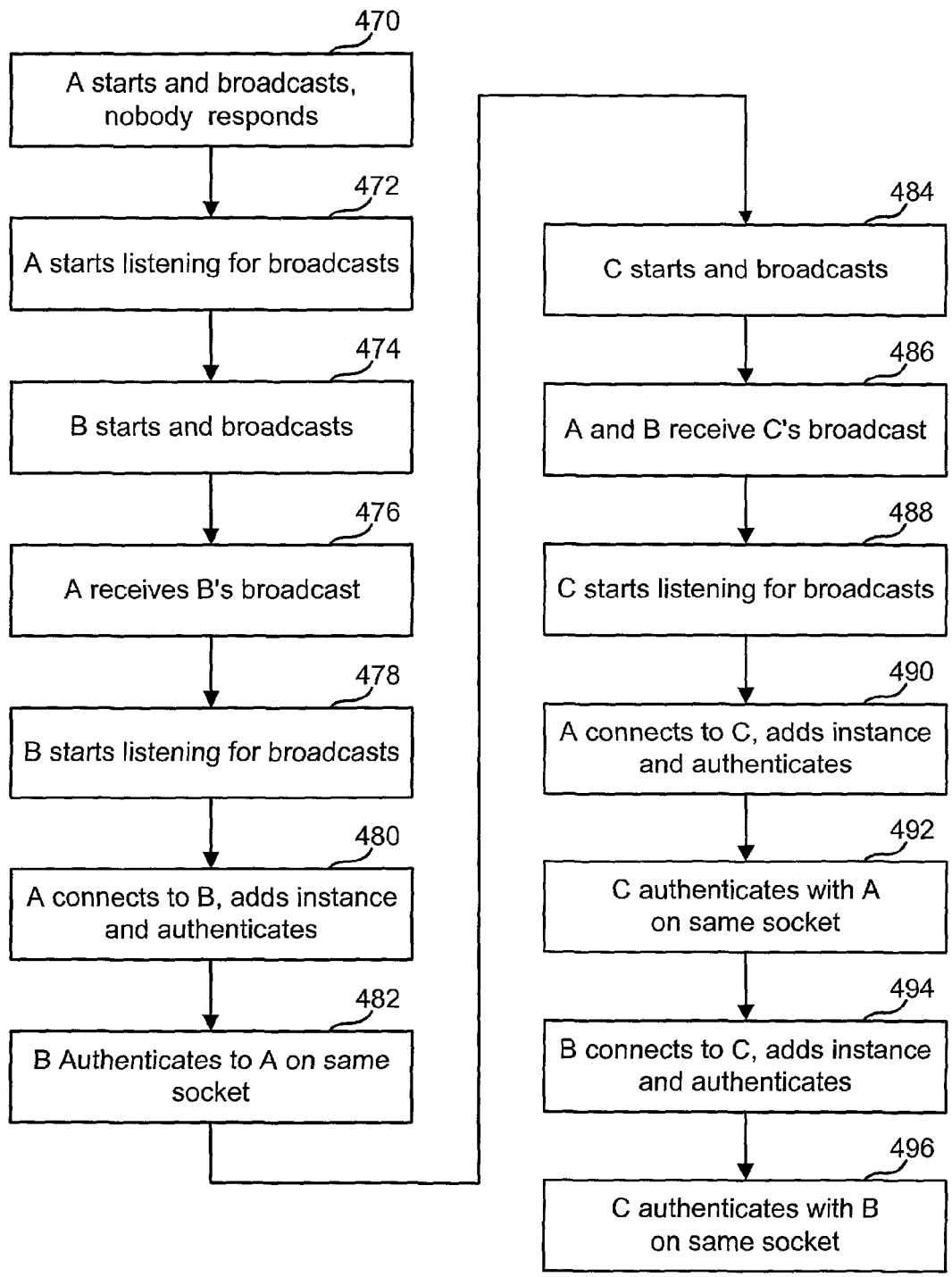
FIG. 12 is a flow chart describing one embodiment of a process for self discovery.

FIG. 12 is a flowchart describing the process for starting the device-to-device network without a server. This process is called self-discovery. The example described in FIG. 12 includes three devices that attempt to create a device-to-device network. For example purposes, the devices will be called device A, device B and device C (e.g., Joe's home computer 10, Joe's handheld device 12, Joe's AV device 14). In step 470, device A starts and broadcasts a message on the network. Since no one else is on the network, nobody responds. In step 472, device A begins to listen for broadcasts. In step 474, device B starts and broadcasts on the network. This time, device A is listening so device A will receive device B's broadcast in step 476. In step 478, device B starts listening for broadcasts. In step 480, device A attempts to connect to device B. The attempt to connect includes informing device B of the instance of device A and authenticating with device B. By authenticating, it is meant that device A sends a username and password associated with the instance of device A. If device B is using the same username and password or a username and password from the same group (depending on the embodiment), then device A will be authenticated with device B. Device B authenticates to device A on the same socket in step 482. In step 484, device C starts and broadcasts on the network. In step 486, device A and device B receive device C's broadcast. In step 488, device C starts listening for broadcasts on the network. In step 490, device A connects to device C, informing device C of its instance and authenticating with device C. In step 492, device C authenticates with device A on the same socket that device A authenticated with device C. In step 494, device B connects to device C, informs device C of the instance of device B that is logging in and authenticates with device C. In step 496, device C authenticates with device B on the same socket that device B authenticated with device C. After step 496, all three devices are on the device-to-device network and can access each other. In some embodiments, a device is accessible on the device level. That is if the user is authenticated with a device, the user can access anything on the device. In other embodiments, different items on the device can have different access levels so that different sets of users can access different items.

In some embodiments of the system of FIG. 1, some devices can operate offline. That is, if a device loses its connection to server 2, it can still operate in an offline mode. Devices in an offline mode will broadcast availability and listen for other broadcasts. When devices are discovered, they will initiate connections to each other (one connection per pair of devices), authenticate the connection with the challenge/response method used for server authentication, and use that channel for operation.

Digital recording on computers and digital video recorders, if owned by a user, can significantly increase the amount of content available on the device-to-device network. Conceivably, content providers may not want content to move off devices that the content was delivered to. To prevent this, a security wrapper and/or watermark can be added such that restrictions can be placed on the usage of the recording. Examples are limited time use, limited number of uses, types of devices authorized for playback and playback only by particular users. To relax or remove usage restrictions, a fee can be paid to a clearinghouse that will compensate the copyright holders and any other entities supporting the transaction including the network provider and content provider.

New recording technologies cache programming based on user preferences and predictions as to the type of programming the user enjoys. The owner of the device does not necessarily know what was being recorded, but likable content would be presumably be waiting for the user when he/she returns to the device. What happens, in effect, is that the content is being time shifted. Programming that is distributed on a fixed schedule can now be viewed at a different time. The addition of the device-to-device networking capability opens a new category of distribution: time shifted redistribution. Content that was broadcast at an earlier time can later be redistributed, with proper authorization, from user to user and device-to-device. Using security wrappers and an authorization/transaction server, revenue can be generated from the movement of content from user to user and/or device-to-device in the form of pay-per-view fees or the purchase of content.

Due to differing usage patterns and storage capabilities of devices, it can be quite possible that a particular device can run out of storage, although the network as a whole can still have significant storage space available (and other devices). A device-to-device network can leverage other devices to move data to where space is available. For example, if a digital video recording device needs to store a video clip and its internal storage device is full, it could archive content onto a computer and free up internal space for the video clip. This would happen with or without minimal user intervention. The capabilities of the network would allow it to later retrieve or restore the content as needed.

Marketing information can be collected from the device-to-device network about the user. Information such as what content the user is storing, the type of searches being performed, the types of devices owned by the user, usage patterns, etc., can be used to profile the customer for potential services and demographics purposes. Information can also be collected as aggregate information of users and/or devices. Profiling information can also be used to recommend content to users. Recommendations can be formed based on collaborative filtering, whereby users with similar profiles can be introduced to each other's content. Profiling information can also be used to target advertising to users of the device-to-device network. Advertising targeted specifically at the user can be inserted into the user interfaces and the commercial (fee or no fee) content that flows through the network.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for communicating data, comprising:
receiving a request from a source device to access a network of devices, said network of devices includes a first set of devices, which said source device is authorized to access, and which have been authenticated based on an associated identifier, and a second set of devices, which said source device is not authorized to access, said first set of devices being distributed across a global network;
determining that said source device is authorized to access first set of devices based on a correspondence between an identifier of said source device and said associated identifier; and
responsive to said determining, allowing communication between said source device and said first set of devices, and not allowing communication between said source device and said second set of devices;
wherein allowing communication includes:
receiving, at an intermediate entity, and from said source device, a request to search;
forwarding said request to search from said intermediate entity to said first set of devices;
performing searches at said first set of devices based on said request to search; attempting to provide results from said searches directly to said source device from said first set of devices via direct connections which bypass said intermediate entity; and
providing said results from said searches to said source device from said first set of devices via said intermediate entity if said direct connections cannot be established, said intermediate entity receiving a request to access a network of devices.

2. A method for communicating data, comprising:
receiving a request from a source device to access a network of devices, said network of devices includes a first set of devices, which said source device is authorized to access, and which have been authenticated based on an associated identifier, and a second set of devices, which said source device is not authorized to access, said first set of devices being distributed across a global network;
determining that said source device is authorized to access first set of devices based on a correspondence between an identifier of said source device and said associated identifier; and
responsive to said determining, allowing communication between said source device and said first set of devices, and not allowing communication between said source device and said second set of devices;
wherein allowing communication includes:
transmitting a search request from said source device to a target device, which belongs to said first set of devices;
performing a search at said target device based on said search request; and
providing results from said search from said target device to said source device via a connection between said source device and said target device, said source device is in a private network, said source device has a private address and does not have a globally unique address, said target device has a globally unique address and is inaccessible via an Interact.

3. A method for communicating data, comprising:
receiving a request from a source device to access a network of devices, said network of devices includes a first set of devices, which said source device is authorized to access, and which have been authenticated based on an associated identifier, and a second set of devices, which said source device is not authorized to access, said first set of devices being distributed across a global network;
determining that said source device is authorized to access first set of devices based on a correspondence between an identifier of said source device and said associated identifier; and
responsive to said determining, allowing communication between said source device and said first set of devices, and not allowing communication between said source device and said second set of devices;
wherein allowing communication includes:
attempting to establish a first connection from said source device to a target device;
transferring an item using said first connection if said attempt to establish said first connection was successful;
sending a message to said target via an intermediate device if said attempt to establish said first connection was not successful;
attempting to establish a second connection from said target device to said source device;
transferring said item using said second connection if said attempt to establish said second connection was successful; and
transferring said item via a proxy if said attempt to establish said second connection was not successful.

4. A method for communicating data, comprising steps of:
receiving a request from a source device to access a network of devices, said network of devices includes a first set of devices, which said source device is authorized to access, and which have been authenticated based on an associated identifier, and a second set of devices, which said source device is not authorized to access;

determining that said source device is authorized to access said first set of devices based on a correspondence between an identifier of said source device and said associated identifier; responsive to said determining step, identifying items on said first set of devices; and responsive to said step of identifying said items, creating a playlist of said items on said first set of devices, said playlist includes items on different devices.

5. A method according to claim 4, wherein: said creating a playlist comprises creating a playlist of items on different types of devices.

6. A method according to claim 4, wherein said step of identifying items includes steps of:
receiving a request at an intermediate entity from said a source device to search;
forwarding said request to search from said intermediate entity to said first set of devices;
performing searches at said first set of devices based on said search request; attempting to provide results from said searches directly to said source device tram said first set of devices via direct connections which bypass said intermediate entity; and
providing said results from said searches to said source device from said first set of devices via said intermediate entity if said direct connections cannot be established.

7. A method of communicating data, comprising:
logging a first device into a network of devices using a first user identification, said network of devices includes devices logged into said network using said first user identification and devices logged in to said network using one or more other user identifications, said one or more other user identifications include a second user identification;
identifying said devices that are logged in to said network using said first user identifications; and
responsive to identifying, allowing said first device to communicate with said devices that are logged into said network using said first user identifications and not allowing said first device to communicate with said devices that are logged in to said network using said second user identification;
wherein allowing said first device to communicate includes:
receiving a request at an intermediate entity from a requesting device to search, said requesting device is logged into said network using said first user identification;
forwarding said request to search from said intermediate entity to said devices that are logged in to said network using said first user identification;
performing searches at said devices that are logged in to said network using said first user identification based on said request;
attempting to provide results from said searches directly to said requesting device from said devices that are logged in to said network using said first user identification via direct connections which bypass said intermediate entity; and
providing said results from said searches to said first device from said devices that are logged in to said network using said first user identification via said intermediate entity if said direct connections cannot be established.

8. A method of communicating data, comprising:
logging a first device into a network of devices using a first user identification, said network of devices includes devices logged into said network using said first user identification and devices logged in to said network using one or more other user identifications, said one or more other user identifications include a second user identification;
identifying said devices that are logged in to said network using said first user identifications; and
responsive to identifying, allowing said first device to communicate with said devices that are logged into said network using said first user identifications and not allowing said first device to communicate with said devices that are logged in to said network using said second user identification;
wherein allowing said first device to communicate includes:
attempting to establish a first connection from said first device to a target device;
transferring an item using said first connection if said attempt to establish said first connection was successful;
sending a message to said target via an intermediate device if said attempt to establish said first connection was not successful, said intermediate entity receiving a request to access a network;
attempting to establish a second connection from said target device to said first device;
transferring said item using said second connection if said attempt to establish said second connection was successful; and
transferring said item via a proxy if said attempt to establish said second connection was not successful.

9. A method of communicating data, comprising:
logging a first device into a network of devices using a first user identification, said network of devices includes devices logged into said network using said first user identification and devices logged in to said network using one or more other user identifications, said one or more other user identifications include a second user identification;
identifying said devices that are logged in to said network using said first user identifications; and
responsive to identifying, allowing said first device to communicate with said devices that are logged into said network using said first user identifications and not allowing said first device to communicate with said devices that are logged in to said network using said second user identification;
wherein allowing said first device to communicate includes sending a command from said first device to an intermediate server; and forwarding said command from said intermediate server to one or more of said devices that are logged in to said network using said first user identification.

10. A method for communicating data, comprising steps of:
receiving, from a requesting device, a request to transfer items residing on a target device;
attempting to establish a first connection, between said requesting device and said target device, in response to receiving;
transferring said item from said target device to said requesting device using said first connection if said attempt to establish said first connection was successful;

sending a message to said target device via an intermediate device if said attempt to establish said first connection was not successful;

receiving an attempt to establish a second connection, between said requesting device and said target device via a proxy, if said attempt to establish said first connection was not successful; and transferring said item using said second connection if said attempt to establish said second connection was successful.

11. One or more processor readable storage devices for storing processor readable code, said processor readable code for programming one or more processors to perform a method comprising steps of:

receiving a request from a source device to access a network of devices, said network of devices includes a first set of devices, which said source device is authorized to access, and which have been authenticated based on an associated identifier, and a second set of devices, which said source device is not authorized to access, said first set of devices being distributed across a global network;

determining that said source device is authorized to access said first set of devices based on a correspondence between an identifier of said source device and said associated; and responsive to said determining, allowing communication between said source device and with said first set of devices, and not allowing communication between said source device and said second set of devices;

wherein allowing communication includes:

receiving, at an intermediate entity, and from said source device, a request to search, forwarding said request to search from said intermediate entity to said first set of devices;

performing searches at said first set of devices based on said request to search;

attempting to provide results from said searches directly to said source device from said first set of devices via direct connections which bypass said intermediate entity; and providing said results from said searches to said source device from said first set of devices via said intermediate entity if said direct connections cannot be established.

12. One or more processor readable storage devices for storing processor readable code, said processor readable code for programming one or more processors to perform a method comprising steps of:

receiving a request from a source device to access a network of devices, said network of devices includes a first set of devices, which said source device is authorized to access, and which have been authenticated based on an associated identifier, and a second set of devices, which said source device is not authorized to access, said first set of devices being distributed across a global network;

determining that said source device is authorized to access said first set of devices based on a correspondence between an identifier of said source device and said associated; and responsive to said determining, allowing communication between said source device and with said first set of devices, and not allowing communication between said source device and said second set of devices;

allowing communication includes:

attempting to establish a first connection from said a source device to a target device;

transferring an item using said first connection if said attempt to establish said first connection was successful;

sending a message to said tat-get device via an intermediate device if said attempt to establish said first connection was not successful, said intermediate entity receiving a request to access a network;

attempting to establish a second connection from said target device to said source device;

transferring said item using said second connection if said attempt to establish said second connection was successful; and transferring said item via a proxy if said attempt to establish said second connection was not successful.

13. One or more processor readable storage devices for storing processor readable code, said processor readable code for programming one or more processors to perform a method comprising steps of:

receiving a request from a source device to access a network of devices, said network of devices includes a first set of devices, which said source device is authorized to access, and which have been authenticated based on an associated identifier, and a second set of devices, which said source device is not authorized to access;

determining that said source device is authorized to access said first set of devices based on a correspondence between an identifier of said source device and said associated identifier;

responsive to said determining, identifying items on said first set of devices; and responsive to said step of identifying said items, creating a playlist of said items on said first set of devices, said playlist includes items on different devices.

14. One or more processor readable storage devices according to claim 13, wherein: said creating a playlist comprises creating a playlist of items on different types of devices.

15. One or more processor readable storage devices according to claim 13, wherein identifying items includes:

receiving a request at an intermediate entity from said a source device to search;

forwarding said request to search from said intermediate entity to said first set of devices;

performing searches at said first set of devices based on said search request;

attempting to provide results from said searches directly to said source device from said first set of devices via direct connections which bypass said intermediate entity; and providing said results from said searches to said source device from said first set of devices via said intermediate entity if said direct connections cannot be established, said intermediate entity receiving a request to access a network of devices.

16. One or more processor readable storage devices for storing processor readable code, said processor readable code for programming one or more processors to perform a method comprising steps of:

logging a first device into a network of devices using a first user identification, said network of devices includes devices logged into said network using said first user identification and devices logged in to said network using one or more other user identifications, said one or more other user identifications include a second user identification;

identifying said devices that are logged in to said network using said first user identification; and responsive to identifying, allowing said first device to communicate with said devices that are logged into said network using said first user identification and not allowing said first device to communicate with said devices that are logged in to said network using said second user identification;

wherein allowing said first device to communicate includes:

receiving a request at an intermediate entity from said first device to search;

forwarding said request to search from said intermediate entity to said devices that are logged in to said network using said first user identification;

performing searches at said devices that are logged in to said network using said first user identification based on said request to search;

attempting to provide results from said searches directly to said first device from said devices that are logged in to said network using said first user identification via direct connections which bypass said intermediate entity; and providing said results from said searches to said first device from said devices that are logged in to said network using said first user identification via said intermediate entity if said direct connections cannot be established.

17. One or more processor readable storage devices for storing processor readable code, said processor readable code for programming one or more processors to perform a method comprising steps of:

logging a first device into a network of devices using a first user identification, said network of devices includes devices logged into said network using said first user identification and devices logged in to said network using one or more other user identifications, said one or more other user identifications include a second user identification;

identifying said devices that are logged in to said network using said first user identification; and responsive to identifying, allowing said first device to communicate with said devices that are logged into said network using said first user identification and not allowing said first device to communicate with said devices that are logged in to said network using said second user identification;

wherein allowing said first device to communicate includes:

attempting to establish a first connection, from said first device to a target device;

transferring an item using said first connection if said attempt to establish said first connection was successful;

sending a message to said target via an intermediate device if said attempt to establish said first connection was not successful, said intermediate device receiving a request to access a network;

attempting to establish a second connection from said target device to said source device;

transferring said item using said second connection if said attempt to establish said second connection was successful; and transferring said item via a proxy if said attempt to establish said second connection was not successful.

18. One or more processor readable storage devices for storing processor readable code, said processor readable code for programming one or more processors to perform a method comprising steps of:

receiving, from a requesting device, a request to transfer an items residing on a target device;

attempting to establish a first connection, between said requesting device and said target device, in response to receiving;

transferring said item from said target device to said requesting device using said first connection if said attempt to establish said first connection was successful;

sending a message to said target device via an intermediate device if said attempt to establish said first connection was not successful;

receiving an attempt to establish a second connection, between said requesting device and said target device via a proxy, if said attempt to establish said first connection was not successful; and transferring said item using said second connection if said attempt to establish said second connection was successful.

19. An apparatus for communicating data, comprising:

a communication interface; and one or more processors, in communication with said communication interface, said one or more processors perform a method comprising steps of:

receiving a request from a source device to access a network of devices, said network of devices includes a first set of devices, which said source device is authorized to access, and which have been authenticated based on an associated identifier, and a second set of devices, which said source device is not authorized to access, said first set of devices being distributed across a global network, determining that said source device is authorized to access identifying said first set of devices based on a correspondence between an identifier of said source device and said associated identifier, and responsive to said determining, allowing communication between said source device and said first set of devices, and not allowing communication between said source device and said second set of devices;

wherein said step of allowing communication includes:

receiving, at an intermediate entity, and from said source device, a request to search;

forwarding said request to search from said intermediate entity to said first set of devices;

performing searches at said first set of devices based on said request to search;

attempting to provide results from said searches directly to said source device from said first set of devices via direct connections which bypass said intermediate entity; and providing said results from said searches to said source device from said first set of devices via said intermediate entity if said direct connections cannot be established, said intermediate entity receiving a request to access a network of devices.

20. An apparatus for communicating data, comprising:

a communication interface; and one or more processors, in communication with said communication interface, said one or more processors perform a method comprising steps of:

receiving a request from a source device to access a network of devices, said network of devices includes a first set of devices, which said source device is authorized to access, and which have been authenticated based on an associated identifier, and a second set of devices, which said source device is not authorized to access, said first set of devices being distributed across a global network, determining that said source device is authorized to access identifying said first set of devices based on a correspondence between an identifier of said source device and said associated identifier, and responsive to said determining, allowing communication between said source device and said first set of devices, and not allowing communication between said source device and said second set of devices;
wherein allowing communication includes:
attempting to establish a first connection from said a source device to a target device;
transferring an item using said first connection if said attempt to establish said first connection was successful;
sending a message to said target device via an intermediate device if said attempt to establish said first connection was not successful, said intermediate entity receiving a request to access a network;
attempting to establish a second connection from said target device to said source device;
transferring said item using said second connection if said attempt to establish said second connection was successful; and
transferring said item via a proxy if said attempt to establish said second connection was not successful.

21. An apparatus for communicating data, comprising:
a communication interface; and
one or more processors in communication with said communication interface, said one or more processor perform a method comprising steps of:
logging a first device into a network of devices using a first user identification, said network of devices includes devices logged into said network using said first user identification and devices logged in to said network using one or more other user identifications, said one or more other user identifications include a second user identification,
identifying said devices that are logged in to said network using said first user identification, and
responsive to said step of identifying, allowing said fast device to communicate with said devices that are logged into said network using said first user identification, and not allowing said first device to communicate with said devices that are logged into said network using said second user identification;
wherein allowing said first device to communicate includes:
receiving a request from said first device at an intermediate entity to search;
forwarding said request to search from said intermediate entity to said devices that are logged in to said network using said first user identification;
performing searches at said devices that are logged in to said network using said first user identification based on said request;
attempting to provide results from said searches directly to said first device from said devices that are logged in to said network using said first user identification via direct connections which bypass said intermediate entity; and
providing said results from said searches to said first device from said devices that are logged in to said network using said first user identification via said intermediate entity if said direct connections cannot be established.

22. An apparatus for communicating data, comprising:
a communication interface; and
one or more processors in communication with said communication interface, said one or more processor perform a method comprising steps of:
logging a first device into a network of devices using a first user identification, said network of devices includes devices logged into said network using said first user identification and devices logged in to said network using one or more other user identifications, said one or more other user identifications include a second user identification,
identifying said devices that are logged in to said network using said first user identification, and
responsive to said step of identifying, allowing said fast device to communicate with said devices that are logged into said network using said first user identification, and not allowing said first device to communicate with said devices that are logged into said network using said second user identification;
wherein allowing said first device to communicate includes:
attempting to establish a first connection from said first device to a target device;
transferring an item using said first connection if said attempt to establish said first connection was successful;
sending a message to said target device via an intermediate device if said attempt to establish said first connection was not successful, said intermediate entity receiving a request to access a network;
attempting to establish a second connection from said target device to said source device;
transferring said item using said second connection if said attempt to establish said second connection was successful; and
transferring said item via a proxy if said attempt to establish said second connection was not successful.

* * * * *